(12) United States Patent
McIntyre

(10) Patent No.: US 6,431,565 B2
(45) Date of Patent: *Aug. 13, 2002

(54) MOTOR VEHICLE SUSPENSION ALIGNMENT ADJUSTER

(76) Inventor: Kevin Joseph McIntyre, 138 Oxford Street, Woollahra, New South Wales, 2025 (AU)

( * ) Notice: Subject to any disclaimer, the term of this patent is extended or adjusted under 35 U.S.C. 154(b) by 0 days.

This patent is subject to a terminal disclaimer.

(21) Appl. No.: 09/845,147

(22) Filed: Apr. 30, 2001

Related U.S. Application Data

(63) Continuation of application No. 09/341,110, filed on Aug. 24, 1999, now Pat. No. 6,224,075.

(30) Foreign Application Priority Data

Nov. 3, 1997 (AU) .............................................. PP0143

(51) Int. Cl.[7] .............................................. B62D 17/00
(52) U.S. Cl. .............................. 280/86.751; 280/86.756
(58) Field of Search .......................... 280/86.751, 86.75, 280/86.752, 86.753, 86.754, 86.755, 86.756, 86.758

(56) References Cited

U.S. PATENT DOCUMENTS 6,224,075 B1 * 5/2001 McIntyre ............... 280/86.751
6,293,724 B1 * 9/2001 Spears et al. .......... 280/86.751

* cited by examiner

*Primary Examiner*—Paul N. Dickson
*Assistant Examiner*—Ruth Ilan
(74) *Attorney, Agent, or Firm*—Ladas & Parry

(57) ABSTRACT

Castor of a motor vehicle suspension, typically having a wishbone (1), is adjusted by mounting the suspension upright ball joint (4) in a housing (6) having an offset spigot (10) rotatable by an Allen key engaged in the spigot to move the ball joint backward and forward while the spigot is restrained by a slot (16) in a location bracket (14) engaged with the wishbone. Camber is adjusted by a threaded adjuster (24) operable between the location bracket (14) and the housing (6) while allowing rotation of the housing relative to the bracket.

15 Claims, 2 Drawing Sheets

MOTOR VEHICLE SUSPENSION ALIGNMENT ADJUSTER

This application is a continuation of U.S. Ser. No. 09/341,110 filed Aug. 24, 1999, now U.S. Pat. No. 6,224,075 B1 which is hereby incorporated herein by reference.

TECHNICAL FIELD

This invention relates to a motor vehicle suspension alignment adjuster and has been devised particularly though not solely for aligning the camber and castor in the front suspension of a motor vehicle having a suspension upright connected to a transverse control arm by way of a ball joint. Such suspension configurations typically include the so-called "wishbone" suspensions and their equivalents.

1. Background Art

In the past it has been difficult to provide adequate camber and castor adjustment in the front suspensions of various vehicles particularly those with wishbone-type suspensions. Such vehicles include most of the Honda range of motor vehicles where it is impossible to provide sufficient camber and castor adjustment to compensate for serious misalignment as the motor vehicle ages, or after accident damage rectification.

2. Disclosure of the Invention

In one aspect the present invention therefore provides a motor vehicle suspension alignment adjuster comprising a housing adapted to locate the upper ball joint of a suspension upright, a location bracket arranged to locate the housing in a suspension control arm, camber adjustment means operable between the housing and the location bracket to move the housing relative to the location bracket in a transverse direction in the vehicle, castor adjustment means operable between the housing and the location bracket to move the housing relative to the location bracket in a longitudinal direction in the vehicle, and locking means arranged to lock the castor adjustment means in position.

Preferably the castor adjustment means comprises a spigot extending upwardly from the housing, the axis of the spigot being offset from the ball joint, and the spigot passing through a transversely extending slot in the location bracket so that rotation of the spigot relative to the location bracket causes rotation of the housing and longitudinal movement of the ball joint relative to the motor vehicle.

In one form of the invention, the location bracket incorporates an upwardly extending cylindrical flange adapted to form a rotatable fit within a circular aperture in the suspension control arm.

Preferably the spigot is provided with a male thread, and the locking means comprise a flange nut engageable over the threaded spigot such that the flange nut can be tightened on the spigot to clamp the housing and location bracket against the lower side of the control arm with the flange nut located against the upper side of the control arm.

Preferably the castor adjustment means includes a non-circular aperture in the upper end of the spigot, engageable with a suitable tool for rotation of the spigot and therefore of the housing to effect castor adjustment.

Preferably the aperture in the top of the spigot is hexagonal in cross-section, adapted to receive an Allen key for castor adjustment.

Preferably the camber adjustment means comprise a threaded adjuster extending laterally (with respect to the motor vehicle) between the housing and the location bracket.

In one form of the invention the threaded adjuster is engaged with the housing by way of a circumferential arm extending from the housing, the circumferential arm having a circumferential slot therein adapted to guide and locate a captive nut threadedly engaged with the threaded camber adjuster.

Preferably the location bracket includes inwardly extending malleable arms which can be bent to contact surfaces on the suspension control arm, inhibiting rotation of the location bracket relative to the control arm.

BRIEF DESCRIPTION OF THE DRAWINGS

Notwithstanding any other forms that may fall within its scope, one preferred form of the invention will now be described by way of example only with reference to the accompanying drawings, in which.

MODES FOR CARRYING OUT THE INVENTION

Figure 1:
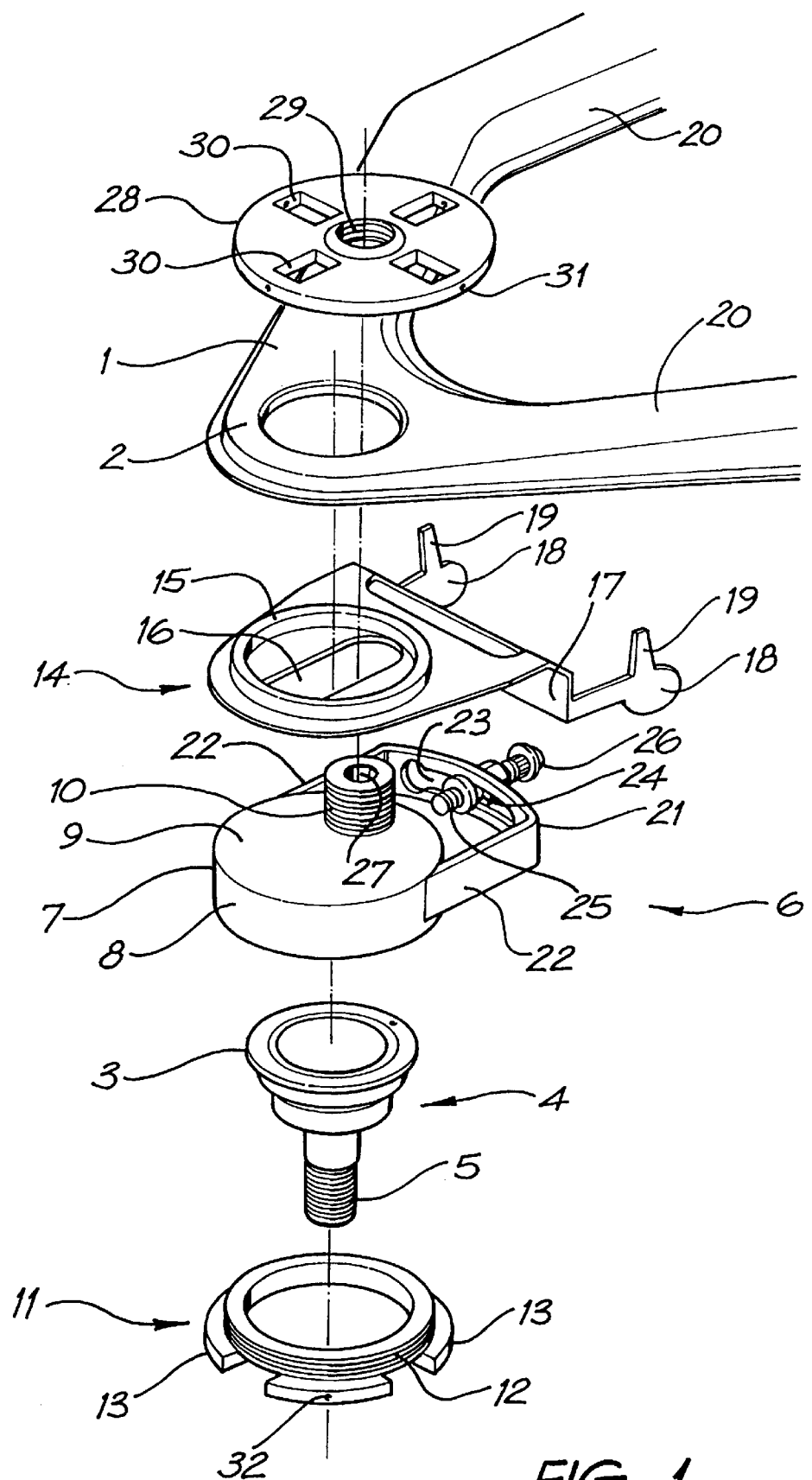
FIG. 1 is an exploded perspective view of a motor vehicle suspension alignment adjuster according to the invention.

In the preferred form of the invention a motor vehicle suspension alignment adjuster is provided for the front suspension of a motor vehicle which has an upper control arm in the form of a wishbone 1 although it will be appreciated that the adjuster can be used in various other motor vehicle suspension configurations where it is desired to provide camber and castor adjustment at the upper end of a suspension upright.

In its original form the motor vehicle suspension typically comprises an upper wishbone arm shown at 1 having a circular aperture 2 in which there is engaged by way of a press fit the flange 3 of a ball joint 4. The ball joint is engaged with the motor vehicle suspension upright by way of a threaded stud 5 in the normal manner.

To provide adequate camber and castor to a suspension of this configuration, the ball joint 4 is pressed out of the circular opening 2, typically by using a bench press and the suspension alignment adjuster according to the invention is incorporated as follows.

The adjuster comprises a housing 6 which has a cylindrical portion 7 having a downwardly opening cylindrical cavity defined by a cylindrical wall 8 and an upper closed circular end 9. A threaded spigot 10 is provided extending upwardly from the circular end 9 and having its axis parallel to but offset from the axis of the cylindrical portion 7.

The cavity in the cylindrical portion is sized to be a snug fit around the upper flange 3 of the ball joint 4 which is inserted into the cylindrical cavity and held in place by a retaining nut 11 which has a threaded portion 12 engageable with a female thread (not shown) in the cylindrical cavity of the housing 6. The ball joint is retained in place by engaging the retaining nut 11 and torquing it to the required tension with a socket drive engaged with the castellations 13 on the retaining nut.

The alignment adjuster further comprises a location bracket 14 having an upwardly extending circular flange 15 which fits in the circular aperture 2 in the control arm 1. The housing incorporates an elongate slot 16 located within the circular flange 15 and adapted to form a neat sliding fit with the spigot 10 of the housing 6.

The location bracket further includes a downwardly extending flange 17 and outwardly extending malleable arms 18 which may have upwardly extending tabs 19 thereon engageable by bending between the inner faces 20 of the wishbone control arm 1 to prevent unwanted rotation of the location bracket relative to the wishbone control arm during castor adjustment.

The housing 6 further incorporates a circumferential arm 21 which is typically supported by tangential arms 22 from the cylindrical portion 7 of the housing. The circumferential arm 21 incorporates a circumferential slot 23 in which is slideably engaged a captive nut 24 threadedly engaged with a threaded adjuster in the form of bolt 25 having a head 26 located away from the cylindrical portion 7 of the housing 6.

The head 26 is rotatably engaged with the downwardly extending flange 17 of the location bracket 14 in a manner allowing rotation of the bolt 25 by means of a socket or spanner applied to the head 26, while inhibiting axial movement of the bolt head 26 relative to the flange 17.

The upper end of the spigot 10 is provided with an engagement aperture for a tool and this typically takes the form of a hexagonal cross-section aperture 27 adapted to receive a suitable Allen key.

In use the suspension alignment adjuster is assembled on the control arm 1 by passing the spigot 10 upwardly through the slot 16 and the circular flange 15 upwardly through the aperture 2. The assembly is retaining in position by engaging an upper flange nut 28 having a female threaded aperture 29 with the thread on the spigot 10. The flange nut 28 is loosely engaged to permit both rotational movement of the spigot 10 and also lateral movement of the spigot guided by the slot 16.

To align the wheels in the motor vehicle, the head 26 of the bolt 25 is rotated using a suitable socket or spanner to move the housing 6 transversely across the motor vehicle with the spigot 10 being guided in the slot 16, until the desired camber setting is achieved.

An Allen key is then inserted into the hexagonal aperture 27 in the top of spigot 10 and the spigot rotated until the desired castor setting is achieved. Rotation of the spigot 10 causes rotation of the cylindrical housing 7 which will cause the axis of the cylindrical housing to move longitudinally in the motor vehicle due to the offset between the vertical axis of the spigot 10 and the vertical axis of the cylindrical portion 7 of the housing 6. The rotational movement of the housing 6 is accommodated by the circumferential slot 23 in circumferential arm 21.

Once the desired castor setting is reached, the Allen key is held in the desired position in the spigot 10 while the flange nut 28 is tightened typically using a 12 mm socket drive engaged in holes 30 in the flange nut.

At this point the motor vehicle is normally lowered on its suspension and the settings checked with the adjustment procedure repeated if necessary to obtain the optimum settings.

The flange nut 28 is then torqued to the desired setting to maintain integrity of the adjuster. Once this has been achieved, the adjustment may be securely maintained by engaging a lock wire (not shown) with holes 31 in the periphery of the flange nut 28 and further holes 32 in the periphery of the castellations 13 on the retaining nut 11.

In a simpler form of the invention, it is possible to provide the motor vehicle suspension alignment adjuster incorporating a replacement ball joint 4 having an upper part integrated with the housing 6. This enables a simplification by reducing the number of parts, e.g. by dispensing with the retaining nut 11 and also enables a simplification of the camber adjustment mechanism. The simplified form of the invention will now be described with reference to FIGS. 2 and 3.

The location bracket 14 is formed similar to the bracket shown in FIG. 1 with an elongate slot 16, a downwardly depending flange 17 and outwardly extending malleable arms 18 with tabs 19 engageable by bending between the inner faces 20 (FIG. 1) of the wishbone control arm 1.

The ball joint 4 is now provided integral with the housing 6 so that the threaded spigot 10 incorporating hexagonal aperture 27 for an Allen key, extends upwardly through the slot 16 in the location bracket 14.

Figure 2:
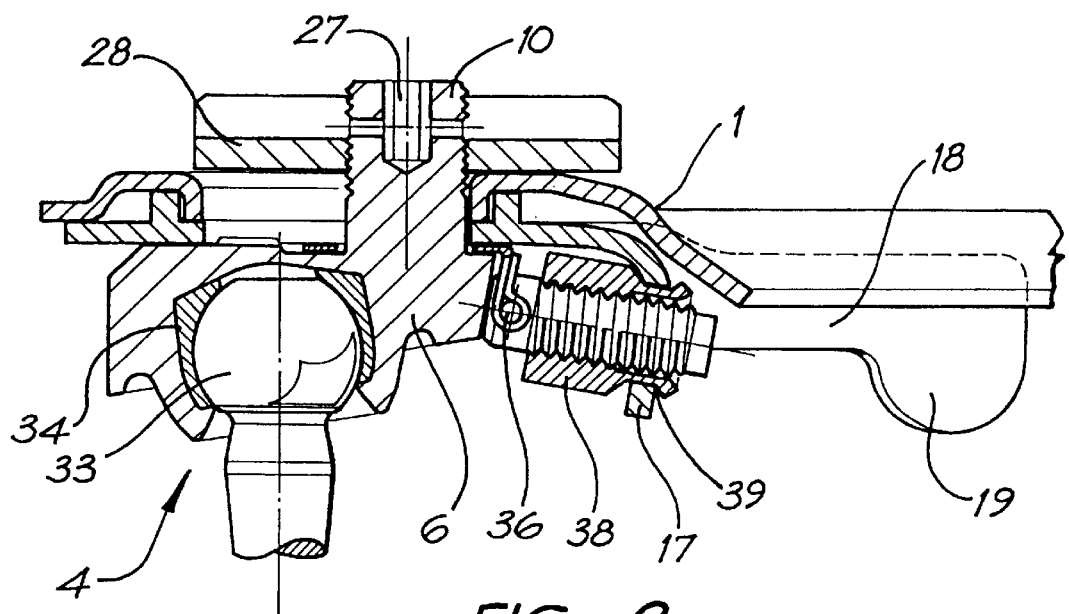
FIG. 2 is a cross-sectional elevation through an alternative form of adjuster according to the invention.
Figure 3:
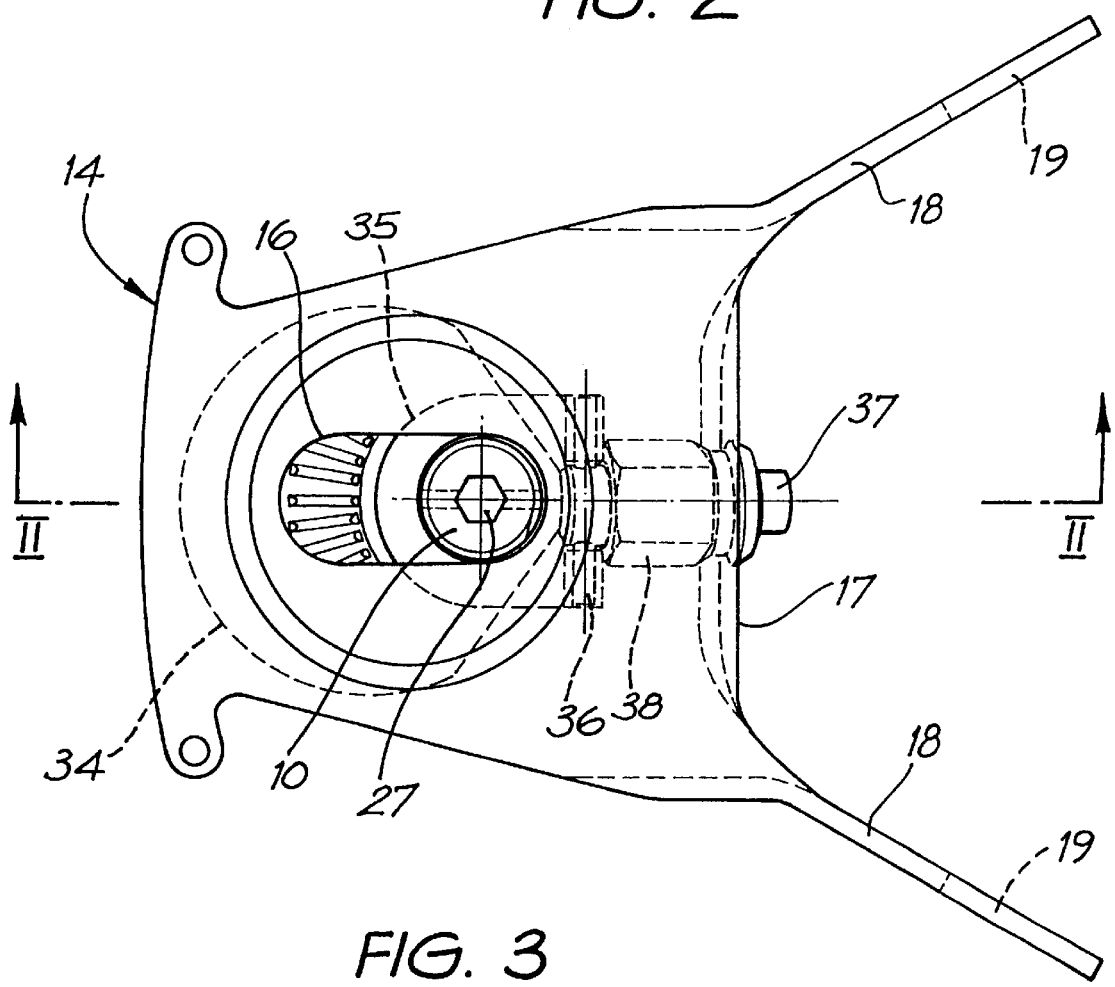
FIG. 3 is a plan view of the adjuster shown in FIG. 2 with various components omitted for clarity.

The ball 33 of the ball joint 4 is located within socket 34, now formed internally within the housing 6 with the socket having an axis offset from the axis of the spigot 10 as can be clearly seen in FIG. 2 and by referring to the outline of the socket 34 shown in broken outline in FIG. 3.

The camber adjuster in the simplified form now comprises a simple sliding plate 35 located below the face of the location bracket 14 and having a hole therein encircling the spigot 10. The right hand end of the plate 35 (as seen in FIG. 3) is provided with a pivot pin 36 engaged transversely through a threaded stud 37 which extends outwardly and through the downwardly extending flange 17 in the location bracket 14. A nut 38 is threadedly engaged on the stud 37 and is provided with a recessed neck 39 engaging a hole of corresponding size in the flange 17 as can be seen in FIG. 2.

In this manner rotation of the nut 38 by a suitable open ended spanner causes the threaded stud 37 to move axially, causing movement of plate 35 and therefore movement of the threaded spigot 10 within the slot 16.

This movement moves the entire ball joint 4 transversely relative to the vehicle, causing changes in the camber of the associated wheel.

The castor is adjusted as before by inserting an Allen key in hexagonal aperture 27, rotating the spigot 10 and hence the housing 6 (about the axis of the spigot), causing longitudinal movement of the ball joint in the motor vehicle due to the offset between the axis of the ball joint 4 and the spigot 10.

Once the desired settings are achieved, the flange nut 28 (omitted from FIG. 3 for clarity) is tightened to a desirable torque and wired in place to maintain the camber and castor settings as previously described.

In this manner a motor vehicle suspension alignment adjuster is provided which enables significant castor and camber adjustments to be made in the suspensions of motor vehicles where such adjustments have hitherto not been possible. Such vehicles typically include the Honda range of motor vehicles where the front suspension is commonly of the double wishbone type and which are not suitable for use with other forms of adjuster previously available. It will be appreciated however that the motor vehicle suspension alignment adjuster according to the invention can be used in any form of motor vehicle suspension where there is a suspension upright located and mounted at its upper end by a ball joint of the type generally shown at 4 in the accompanying drawing.

I claim:

1. A motor vehicle suspension alignment adjuster for a suspension having an upright structure mounting an upper ball joint and a control arm normally adapted to receive the ball joint for relative rotational movement, the adjuster comprising a housing adapted to locate the upper ball joint, a location bracket for locating the housing in the control arm, camber adjustment means operable between the housing and the location bracket to move the housing relative to the location bracket in a transverse direction in the vehicle whereby the angle of an upwardly extending axis of the upright structure with respect to the vertical is adjusted, and locking means arranged to lock the housing and location bracket relative to the control arm.

2. A motor vehicle suspension alignment adjuster for a suspension as claimed in claim 1, wherein the camber adjustment means comprises a transversely extending slot in the location bracket and the adjuster further includes a screw threaded member adapted to engage in the slot and be located at a selected position along the slot corresponding to the desired camber, the locking means having means to screw-threadably engage with the screw threaded member to clamp the adjuster in the desired camber setting.

3. A motor vehicle suspension alignment adjuster as claimed in claim 2, wherein the camber adjustment means further comprises a threaded adjuster extending laterally, with respect to the motor vehicle, between the housing and the location bracket for displacing the screw-threaded member along the slot to the desired location.

4. A motor vehicle suspension alignment adjuster as claimed in claim 3 and wherein the screw threaded member is in the form of an upwardly extending spigot extending from the housing and having a screw threaded upper end portion and the locking means comprises a locking nut adapted to be tightened on the spigot to fix the adjuster relative to the control arm.

5. A motor vehicle suspension alignment adjuster as claimed in claim 4 and wherein the slot is provided in the location bracket and receives the spigot which has an upwardly extending axis offset relative to the upwardly extending axis of the ball joint.

6. A motor vehicle suspension alignment adjuster as claimed in claim 3 and wherein the location bracket has a projecting arm adapted to inter-engage with the threaded adjuster whereby during adjustment rotation of the threaded adjuster displaces the housing relative to the location bracket.

7. A motor vehicle suspension having an upright structure adapted to mount rigidly a shaft of a ball joint having a ball engaged in a housing which is movable through a range of angles, the housing having a location bracket for adjustably mounting the housing and thus the upwardly extending axis of the ball joint in a wishbone type control arm of the suspension structure, the suspension having a transversely directed slot, a screw-threaded slot engaging member and a screw-threaded clamping member for clamping the slot engaging member at a desired position along the desired camber is set.

8. A motor vehicle suspension alignment adjuster for a suspension as claimed in claim 7, wherein the suspension includes a threaded adjuster which displaces the housing relative to the bracket in a transverse direction of the vehicle prior to clamping the suspension in the desired configuration.

9. A motor vehicle suspension adjuster for a suspension having a ball joint having an upwardly extending axis adapted to be mounted at a pre-determined orientation in an upper pivotal control arm of the suspension, the adjuster comprising a housing pivotably accommodating the ball of a ball joint, the ball being connected to a shaft which is adapted to be rigidly secured to a structural element of the suspension with the axis of the ball joint extending upwardly, means for locating and clamping the housing in an aperture in the control arm which originally was adapted to accommodate in a pre-determined orientation an original ball joint, the locating and clamping means including a transversely extending slot accommodating a positioning element adapted to be clamped in a selected position by screw-threaded clamping means, and a threaded adjuster adapted upon rotation to cause the positioning element and thus the housing to be displaced in a transverse direction relative to the vehicle prior to tightening of the clamping means, whereby the camber of the vehicle is adjusted.

10. A motor vehicle suspension alignment adjuster as claimed in claim 9 wherein the locating means includes a location bracket on the housing and having a projecting arm having an aperture in which the threaded adjuster is rotatably but captively mounted.

11. A motor vehicle suspension alignment adjuster as claimed in claims 10, wherein the location bracket has malleable projecting arms which are displaceable under manual pressure to engage exterior structure of the suspension control arm for maintaining a desired orientation prior to and during adjustment to facilitate the desired configuration being selected.

12. A motor vehicle suspension alignment adjuster as claimed in claim 11, wherein the housing has an upwardly extending spigot with a screw threaded portion extending upwardly through a transversely extending slot in the location bracket, the spigot being engaged by a clamping plate when the desired final position is acquired, the spigot being laterally offset in the transverse direction relative to the axis of the ball joint.

13. A motor vehicle suspension alignment adjuster comprising a housing adapted to locate the upper ball joint of a suspension upright, a location bracket arranged to locate the housing in a suspension control arm, camber adjustment means having a transverse slot and a housing positioning element accommodated in the slot and operable between the housing and the location bracket to permit the positioning of the housing relative to the location bracket in a transverse direction in the vehicle, castor adjustment means operable separately of the camber adjustment means and operable between the housing and the location bracket to move the housing relative to the location bracket in a longitudinal direction in the vehicle, and locking means arranged to lock the camber and the castor adjustment means in position.

14. A motor vehicle suspension alignment adjuster as claimed in claim 13, wherein the castor adjustment means comprises a spigot extending upwardly from the housing, the housing having a cylindrical portion and the axis of the spigot being offset from a central axis of the cylindrical portion, so that rotation of the spigot relative to the location bracket causes rotation of the housing and longitudinal movement of the ball joint relative to the motor vehicle.

15. A motor vehicle suspension alignment adjuster as claimed in claim 14, wherein the spigot is provided with a male thread, and the locking means comprise a flange nut engageable over the threaded spigot such that the flange nut can be tightened on the spigot to clamp the housing and location bracket against the lower side of the control arm with the flange nut located against the upper side of the control arm.

* * * * *